United States Patent
Füssl et al.

(10) Patent No.: US 9,919,574 B2
(45) Date of Patent: Mar. 20, 2018

(54) ANTI-ROLL BAR FOR THE ROLLING STABILIZATION OF A VEHICLE AND METHOD FOR OPERATING SUCH AN ANTI-ROLL BAR

(71) Applicant: ZF Friedrichshafen AG, Friedrichshafen (DE)

(72) Inventors: Andreas Füssl, Kressbronn (DE); Roman Frei, Friedrichshafen (DE); Joachim Engel, Markdorf (DE); Notker Amann, Friedrichshafen (DE); Mesut Er, Friedrichshafen (DE); Ulrich Mair, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/121,163

(22) PCT Filed: Jan. 20, 2015

(86) PCT No.: PCT/EP2015/050990
§ 371 (c)(1),
(2) Date: Aug. 24, 2016

(87) PCT Pub. No.: WO2015/128115
PCT Pub. Date: Sep. 3, 2015

(65) Prior Publication Data
US 2017/0008366 A1    Jan. 12, 2017

(30) Foreign Application Priority Data
Feb. 25, 2014  (DE) .................. 10 2014 203 388

(51) Int. Cl.
*B60G 21/055*    (2006.01)

(52) U.S. Cl.
CPC ..... *B60G 21/0555* (2013.01); *B60G 21/0556* (2013.01); *B60G 2200/34* (2013.01);
(Continued)

(58) Field of Classification Search
CPC .......... B60G 21/0555; B60G 2202/42; B60G 2202/442; B60G 2204/419;
(Continued)

(56) References Cited

U.S. PATENT DOCUMENTS

| | | |
|---|---|---|
| 5,060,959 A | 10/1991 | Davis et al. |
| 7,301,295 B2 | 11/2007 | Yamada |

(Continued)

FOREIGN PATENT DOCUMENTS

| | | |
|---|---|---|
| DE | 10 2006 000 408 A1 | 2/2007 |
| DE | 11 2010 005 300 T5 | 12/2012 |
| EP | 1 719 643 A1 | 11/2006 |

OTHER PUBLICATIONS

German Search Report Corresponding to 10 2014 203 388.8 dated Dec. 16, 2014.

(Continued)

*Primary Examiner* — Richard M Camby
(74) *Attorney, Agent, or Firm* — Davis & Bujold PLLC; Michael J. Bujold

(57) ABSTRACT

A stabilizer (105) for the anti-roll stabilization of a vehicle (100). The stabilizer (105) has a first stabilizer element (110) and a second stabilizer element (115). The first stabilizer element (110) is, or can be, coupled to a first wheel suspension element (120) of the vehicle (100) and the second stabilizer element (115) is, or can be, coupled to a second wheel suspension element (125) of the vehicle (100). Furthermore, the stabilizer (105) is provided with an electric motor (135) designed to rotate the first stabilizer element (110), relative to the second stabilizer element (115) in (Continued)

response to a control signal, so as to decouple the first wheel suspension element (120) from the second wheel suspension element (125). In this case the control signal represents a signal determined on the basis of a field-orientated control system.

12 Claims, 5 Drawing Sheets

(52) U.S. Cl.
CPC .... *B60G 2202/42* (2013.01); *B60G 2202/442* (2013.01); *B60G 2204/419* (2013.01); *B60G 2204/4191* (2013.01); *B60G 2400/252* (2013.01); *B60G 2400/954* (2013.01); *B60G 2600/182* (2013.01); *B60G 2600/1872* (2013.01); *B60G 2800/012* (2013.01)

(58) Field of Classification Search
CPC ...... B60G 2204/4191; B60G 2400/252; B60G 2600/1872; B60G 2800/012; B60G 21/0556; B60G 2200/34; B60G 2400/954; B60G 2600/182
See application file for complete search history.

(56) References Cited

U.S. PATENT DOCUMENTS

| | | | |
|---|---|---|---|
| 7,766,344 B2* | 8/2010 | Buma | B60G 3/202 280/124.106 |
| 7,905,499 B2* | 3/2011 | Buma | B60G 17/0162 280/5.511 |
| 8,684,365 B2 | 4/2014 | Kondo | |
| 8,905,414 B2* | 12/2014 | Khanlarov | B60G 21/055 280/124.106 |
| 2012/0313338 A1 | 12/2012 | Kondo | |

OTHER PUBLICATIONS

International Search Report Corresponding to PCT/EP2015/050990 dated Sep. 18, 2015.
Written Opinion Corresponding to PCT/EP2015/050990 dated Sep. 18, 2015.

\* cited by examiner

ANTI-ROLL BAR FOR THE ROLLING STABILIZATION OF A VEHICLE AND METHOD FOR OPERATING SUCH AN ANTI-ROLL BAR

This application is a National Stage completion of PCT/EP2015/050990 filed Jan. 20, 2015, which claims priority from German patent application serial no. 10 2014 203 388.8 filed Feb. 25, 2014.

FIELD OF THE INVENTION

The present invention relates to a stabilizer for the anti-roll stabilization of a vehicle, to a method for operating such a stabilizer, to a corresponding control unit and to a corresponding computer program product.

BACKGROUND OF THE INVENTION

By means of active anti-roll stabilization, the conflict of objectives between high anti-roll rigidity when driving round a curve and decoupling of the wheels during one-sided and alternate-sided excitation can be resolved, which increases the comfort and safety for a person steering the vehicle. For this, passive stabilizers can be replaced by active stabilizers. Active anti-roll stabilization involves, for example, two stabilizer halves and an active element designed to rotate the two stabilizer halves actively relative to one another.

The active element can be in the form of either a hydraulic motor or an electric motor and gear unit. For example, an active roll stabilizing system currently in use, also known as the Active Roll System (ARS), is equipped with a hydraulic motor.

By replacing such a hydraulic system with an electric motor, advantages are obtained with regard to control dynamics, consumption and fitting into the vehicle.

SUMMARY OF THE INVENTION

Against that background the present invention provides an improved stabilizer for the anti-roll stabilization of a vehicle, a method for operating such a stabilizer, a corresponding control unit and, finally, a corresponding computer program product, according to the principal claims. Advantageous design features emerge from the subordinate claims and from the description given below.

The present approach provides a stabilizer for the anti-roll stabilization of a vehicle, wherein the stabilizer has the following features:

a first stabilizer element and a second stabilizer element, such that the first stabilizer element is or can be coupled to a first wheel suspension element of the vehicle and the second stabilizer element is or can be coupled to a second wheel suspension element of the vehicle; and at least one electric motor, which is designed, to rotate the first stabilizer element relative to the second stabilizer element in response to a control signal in order to decouple the first wheel suspension element from the second wheel suspension element, wherein the control signal represents a signal determined using an algorithm of a field-orientated control system.

A vehicle can be understood to be a two-track motor vehicle such as a passenger car or a truck. A stabilizer element can for example be understood to be one part of a two-part torsion bar. The first wheel suspension element can be connected to the second wheel suspension element by way of the torsion bar. The first and second wheel suspension elements can each be for example a control arm, in particular a transverse control arm, or a suspension strut of the vehicle. Between the first and the second stabilizer elements there can be arranged an electric motor. The electric motor can be designed to rotate the first and second stabilizer elements about a common rotational axis, which axis can correspond essentially to a transverse axis of the vehicle, each in a different direction. For this the electric motor can be controlled on the basis of a field-orientated control system. An algorithm of a field-orientated control system, also known as a vector control, can be understood to be an algorithm for implementing a control concept in which sinusoidal or approximately sinusoidal alternating magnitudes such as alternating stresses and alternating currents in conductor loops within the electric motor are regulated to produce an instantaneous value corrected by a phase angle within a period. For this, the alternating magnitudes measured can each be transferred to a co-ordinate system rotating with a frequency of the alternating magnitudes, so that from the alternating magnitudes constant values are obtained with which, for example, methods for the control technique can be applied.

The present approach is based on the recognition that a stabilizer for a vehicle can comprise a two-part torsion bar, whose parts can be rotated relative to one another by means of an electric motor. By rotating the two torsion bar parts in opposite directions in this way, a torsion force introduced into the torsion bar for example by wheel reciprocation on one side of the vehicle can be compensated, so that transmission of the wheel reciprocation from one side of the vehicle to the other side, and thus rolling of the vehicle, is prevented.

Advantageously, in this case the electric motor can be designed to be controlled on the basis of a field-orientated control system or using an algorithm of a field-orientated control system. In this way, even at high rotational speeds the electric motor can deliver sufficiently high torque to follow rapid wheel reciprocations at high vehicle driving speeds. Preferably, the electric motor is associated with a gear system, in particular a planetary gearset. Preferably, the electric motor-gearset system is accommodated in a compact assembly.

Furthermore, the present approach provides a vehicle having at least one stabilizer according to one of the embodiments described herein. A vehicle fitted with such a stabilizer has the advantage of offering high driving safety and a high level of driving comfort.

A method for operating a stabilizer according to an embodiment described herein comprises the following steps:

a reciprocating movement signal is read in, such that the reciprocating movement signal represents reciprocating movement of the first wheel suspension element and/or the second wheel suspension element; and the control signal is provided using an algorithm of a field-orientated control system and using the reciprocating movement signal, so as to rotate the first stabilizer element relative to the second stabilizer element by means of the electric motor in order to decouple the first wheel suspension element from the second wheel suspension element.

In accordance with an embodiment of the present approach, in the step of providing the signal, a d/q transformation can also be carried out in order to determine the control signal. By means of a d/q transformation, three-phase magnitudes such as the U, V, W axes in a three-phase current machine can be converted to a two-axis coordinate system with the axes d and q. In this case the coordinate system rotates with the mutually perpendicular axes d and q together with a rotor of the three-phase current machine. Thus, with a constant rotational speed of the rotor a rotating field can be described mathematically in the form of two magnitudes d and q constant in time, and rotational speed and positioning accuracy of the electric motor control can be improved.

In the read-in step a rotor angle signal can also be read in. In this case the rotor angle signal represents an angle of the rotor of the electric motor. Finally, in the step of providing the signal, the d/q transformation can be carried out using the rotor angle signal. By virtue of the rotor angle signal an accurate position of the rotor can be determined, to ensure that the dig coordinate system is rotating along with the rotor with the correct angular velocity and phase position. For example, the rotor angle signal can be picked up by means of sensors such as Hall or optical sensors attached on the electric motor. Alternatively, the rotor angle signal can also be obtained without sensors by back-coupling, such as by the evaluation of an electric motor force on a stator winding.

A further embodiment of the present approach envisages that in the step of providing the signal, the control signal is also determined by virtue of torque and/or an electric flux density of the electric motor. Alternatively or in addition, the control signal can be determined using a relationship between the torque and the electric flux density. For example, the torque and the electric flux density can be represented by the axes d and q of the d/q transformation and modeled by means of a PI control unit.

Furthermore, in the step of providing the signal, control signal can be determined on the basis of an observer system. An observer system can be understood to mean a mathematical system designed to reconstitute non-measurable magnitudes (for example as virtual control magnitudes) from known input and output magnitudes of an observed reference system. Such an observer system can function as an internal control cycle in order to correct deviations between an ideal model and a real condition of the electric motor. For example, the observer system can be a Luenberger observer (according to the theory by David Luenberger based on a parallel connection of the observer to the control range model). In this way great accuracy can be achieved in the determination of a rotational angle or a rotor speed.

Finally, the present approach provides a control unit designed to carry out all the steps of a method according to one of the embodiments described herein.

In the present case a control unit can be understood to be an electrical unit which processes sensor signals and as a function thereof provides control signals and/or data signals. The control unit can comprise an interface, which can be designed as hardware and/or software. In the case of a hardware design the interfaces can for example be part of a so-termed ASICs system which embodies the widest variety of functions of the control unit. It is also possible, however, for the interfaces to be particular integrated switching circuits or to consist at least in part of discrete structural assemblies. In the case of a software design the interfaces can be software modules, for example present together with other software modules in a microcontroller.

It is also advantageous to have a computer program product with a program code, which can be stored on a machine-readable support such as a semiconductor memory, a hard drive memory or an optical memory, and which is used to carry out the method according to any of the above-described embodiments when the program is run on a computer or other appropriate device.

BRIEF DESCRIPTION OF THE DRAWINGS

Examples of the invention will be explained in more detail with reference to the attached drawings, which show.

DETAILED DESCRIPTION OF THE PREFERRED EMBODIMENTS

In the following description of preferred example embodiments of the present invention, the same or similar indexes are used for elements that act in a similar way, shown in the various figures, so that repeated descriptions of the elements are not needed.

Figure 1:
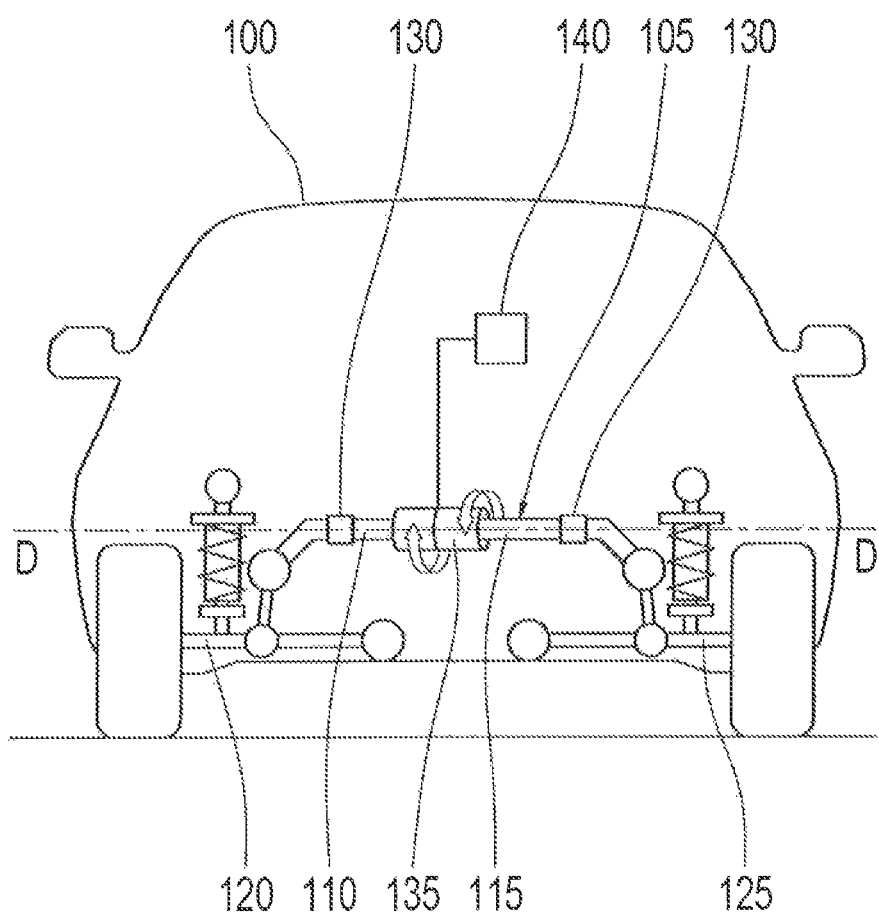
FIG. 1: A schematic representation of a vehicle with a stabilizer according to an example embodiment of the present invention.

FIG. 1 shows a schematic representation of a vehicle 100 with a stabilizer 105 according to an example embodiment of the present invention. The stabilizer is in the form of a two-part torsion bar with a first stabilizer element 110 and a second stabilizer element 115. In this case an end of the first stabilizer element 110 is connected to a first wheel suspension element 120 of the vehicle 100 and an end of the second stabilizer element 115 is connected to a second wheel suspension element 125 of the vehicle 100. For example, the ends of the stabilizer elements 110, 115 are designed as swivel-mounted pendulum supports. The wheel suspension elements 120, 125 are, for example, transverse control arms of the vehicle 100 on opposite sides. The stabilizer elements 110, 115 are each attached to and able to rotate about a common rotational axis D-D, each by virtue of a bearing 130, on a chassis of the vehicle 100. In this case, for example, the rotational axis D-D is a transverse axis of the vehicle 100.

In each case an end of the stabilizer element 110, 115 facing toward the middle of the vehicle 100 is mechanically coupled to a common electric motor 135 as the actuator. The electric motor is designed, in response to a control signal, to rotate the stabilizer elements 110, 115 each in a different direction about the rotational axis D-D. In this case the control signal represents a signal determined on the basis of a field-orientated control system. By virtue of the rotation of the stabilizer elements 110, 115 in opposite directions the wheel suspension elements 120, 125 are, as it were, mechanically decoupled from one another.

According to an example embodiment of the present invention, the vehicle 100 is equipped with a device 140 which is connected to the electric motor 135 and is configured to provide the control signal.

Among other things, the comfort of a vehicle can depend on a so-termed copying behavior. Copying means that wheel reciprocating movement on one side of the vehicle is transmitted to a wheel on the other side of the vehicle by a coupling of the two wheels by means of a stabilizer. In that way the vehicle can be excited into a rolling mode, which can affect comfort adversely.

To avoid such rolling, both a hydraulic and an electromechanical anti-roll stabilization system can be designed so as to decouple the two wheel sides completely from one another.

The two stabilizer halves 110, 115 of the electromechanical system are coupled to one another for example by a planetary gearset and the electric motor 135. If now a wheel on one side is subjected to a vertical reciprocating movement, for example when it rolls over a bump in the road, the electric motor 135 should follow the wheel movement as quickly as possible in order to decouple the two wheels from one another. For that purpose conventional active systems have, for example, a stabilizer with as soft a design as possible.

In that case a degree of stabilizer softness is adjusted for example by the stabilizer itself or by an additional component such as a rubber element in a stabilizer back support or a deflection lever of the stabilizer.

The dynamic components of the wheel reciprocating movement can be absorbed by a stabilizer of such a soft design, so that those movement components do not reach the electric motor.

In contrast, when driving round a curve such a stabilizer may have the effect that the movement introduced by an adjustment system is transmitted to the wheel after some delay.

A very much more rigid stabilizer can have the effect that the adjustment movement is transmitted directly to the wheel and rolling movement so produced when the vehicle is driven round a curve is already eliminated to some extent.

The use of a soft stabilizer or a corresponding element, for example made of rubber, in the stabilizer back support and/or in a stabilizer limb, or a special design of the stabilizer, can entail considerable added cost, particularly as regards assembly and durability. Furthermore, for example additional connection interfaces between an extra element and the stabilizer may be needed. To ensure the durability of the stabilizer, the stabilizer should have a minimum hardness, i.e. the diameter of the stabilizer should not be smaller that a particular value.

To overcome this problem, an electric anti-roll stabilizing system according to an example embodiment of the present invention comprises an electric motor 135 with field-orientated control. In this way a sufficient acceleration torque can be provided over a large range of rotational speeds.

Figure 2:
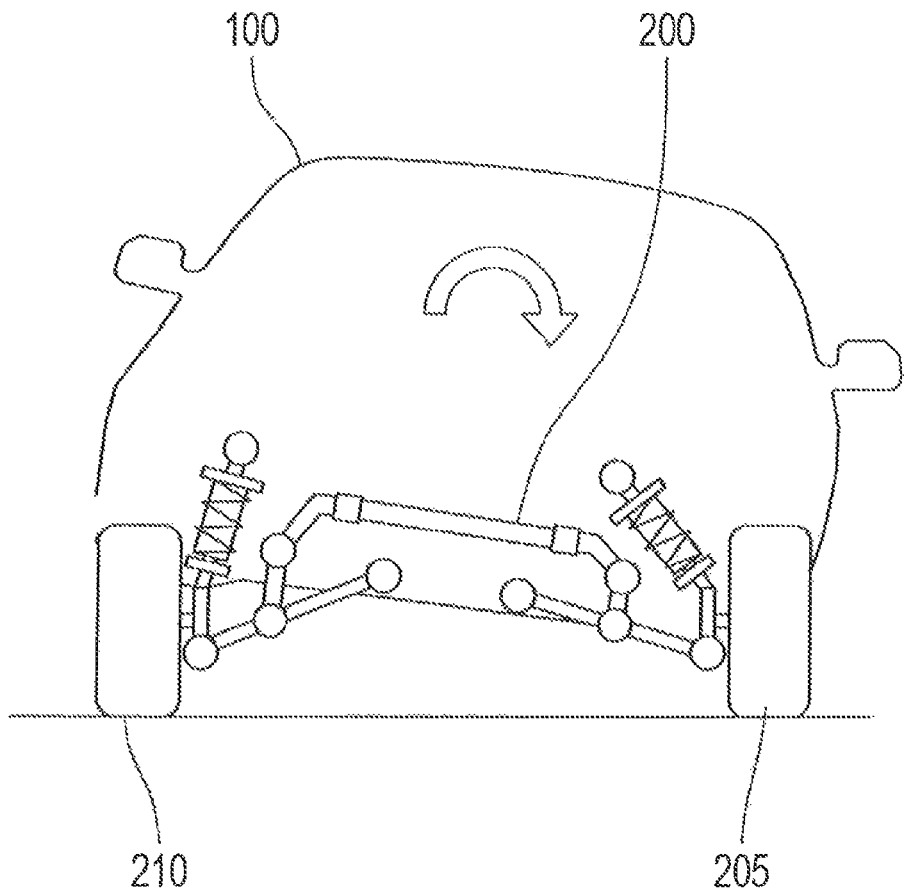
FIG. 2: A schematic representation of a vehicle with a conventional stabilizer, driving round a curve.

FIG. 2 shows a schematic representation of a vehicle 100 with a conventional stabilizer 200, while driving round a curve. In contrast to FIG. 1, the vehicle 100 shown in FIG. 2 is fitted with a stabilizer 200 in the form of a one-piece torsion bar with no electric motor. Due to the centrifugal force, the body of the vehicle 100 tilts toward the outside of the curve, so that the suspension of a wheel 205 of the vehicle 100 on the outside of the curve is compressed.

Due to the compression of the wheel 205 on the outside of the curve the stabilizer 200 is subjected to a rotational movement, with the result that the load on a wheel 210 of the vehicle 100 on the inside of the curve is reduced, or even that the wheel is lifted. Because of this the tilt angle of the vehicle 100 while rounding the curve can be reduced. Conversely, the wheel 210 on the inside of the curve is lowered by an opposite rotational movement of the stabilizer 200 when the suspension of the wheel 205 on the outside of the curve is extended.

Figure 3:
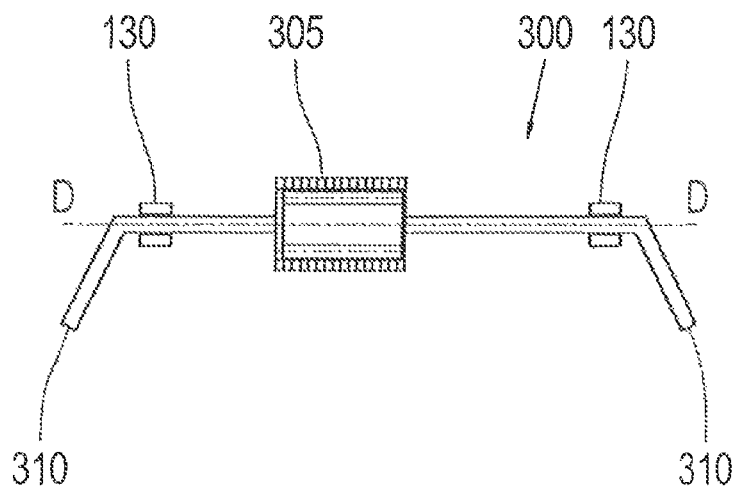
FIG. 3: A schematic representation of a conventional stabilizer for hydraulic anti-roll stabilization.

FIG. 3 shows a schematic representation of a conventional stabilizer 300 for hydraulic anti-roll stabilization. FIG. 3 shows a view of the stabilizer 300 seen from above. As with the stabilizer 100 shown in FIG. 1, the stabilizer 300 shown in FIG. 3 is in the form of a two-part torsion bar with two stabilizer elements 110, 115. Otherwise than in FIG. 1, instead of an electric motor the stabilizer 300 has a hydraulic motor 305 for rotating the two stabilizer elements 110, 115. In an end area remote from the middle of the vehicle each of the stabilizer elements 110, 115 is bent round to form a lever 310 approximately in the longitudinal direction of the vehicle, which can also be called a rod arm. The levers 310 are designed each to be connected with wheel suspension elements (not shown in FIG. 3). A part-section of the stabilizer 300 extending along the rotational axis D-D can also be called a stabilizer back support. The stabilizer back support is mounted rotatably about the rotational axis D-D by means of the bearings 130.

Figure 4:
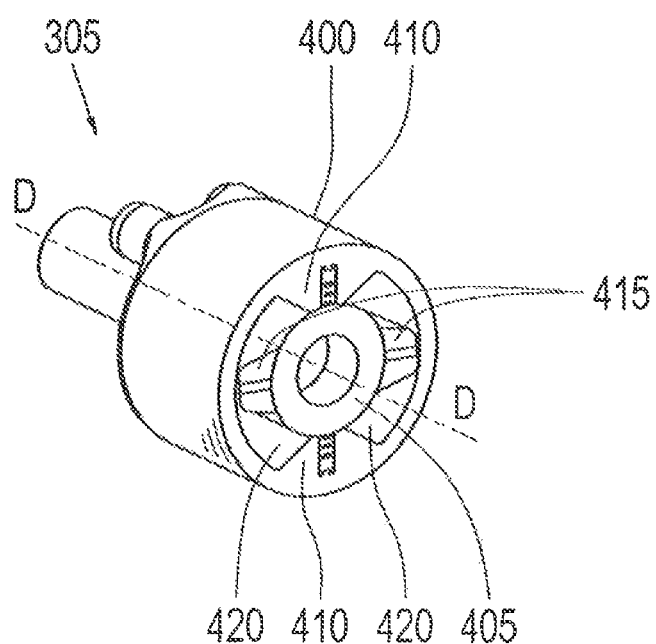
FIG. 4: A schematic representation of a hydraulic motor for use in a conventional stabilizer for hydraulic anti-roll stabilization.

FIG. 4 shows a schematic representation of a hydraulic motor 305 for use in a conventional stabilizer for hydraulic anti-roll stabilization. The hydraulic motor 305 comprises a stator 400 and a rotor 405. The rotor 405 can rotate within the stator 400 about the rotational axis D-D. The stator 400 is designed, for example, with two stator vanes 410. The rotor 405 is designed, for example, with two rotor vanes 415. In the stator vanes 410 and the rotor vanes 415 there is integrated in each case a sealing element 420. In this case a hollow space between each respective stator vane 410 and each rotor vane 415 functions as a working chamber 420. The rotor 405 is designed to be mechanically coupled with stabilizer elements (not shown in FIG. 4).

Figure 5:
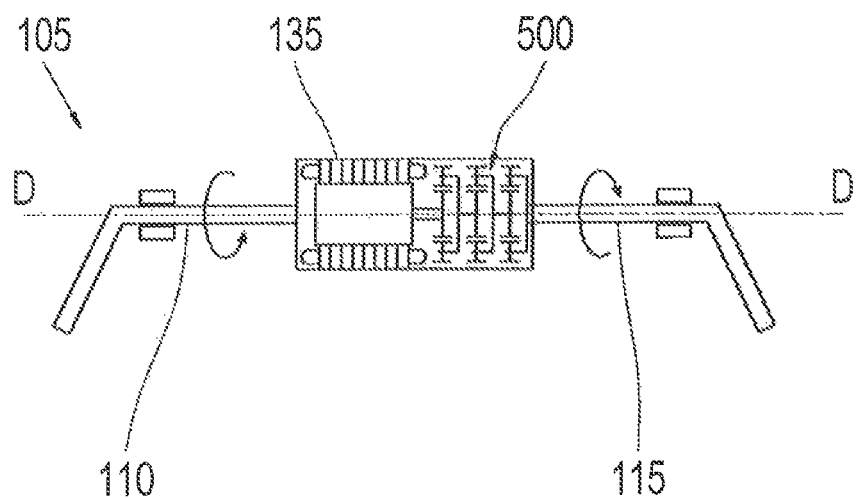
FIG. 5: A schematic representation of a stabilizer according to an example embodiment of the present invention.

FIG. 5 shows a schematic representation of a stabilizer 105 according to an example embodiment of the present invention, FIG. 5 shows a view of the stabilizer 105 seen from above. The stabilizer 105 is designed similarly to the stabilizer 300 shown in FIG. 3. Otherwise than in FIG. 1, a planetary gearset 500 is connected upstream from the electric motor 135 in FIG. 5. The gearset 500 is designed, for example, to convert a rotational movement of a rotor of the electric motor 135 into two rotational movements of the stabilizer elements 110, 115 in opposite directions about the rotational axis D-D.

Figure 6:
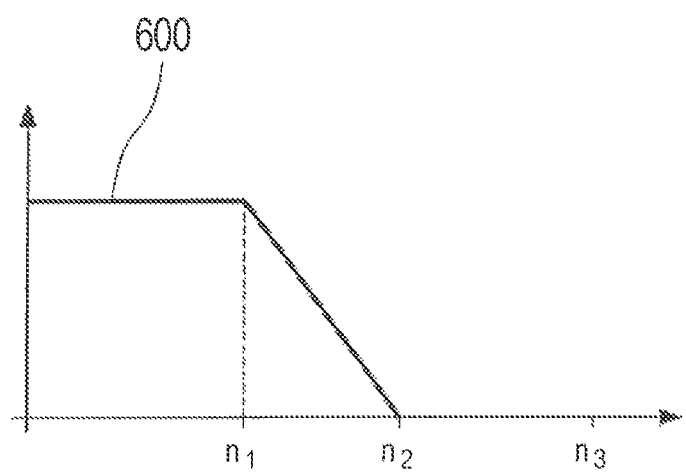
FIG. 6: A diagram to represent a performance graph of an electric motor with brushless DC control.

FIG. 6 shows a diagram representing a performance graph 600 of an electric motor with brushless DC control (BLDC; "brushless, direct current"). In this case the ordinate of the diagram represents the torque of the electric motor in Newton-meters and the abscissa of the diagram represents the rotational speed of the electric motor in revolutions per minute. From the diagram in FIG. 6 it is evident that the torque of the electric motor is at first constant with increasing rotational speed of the motor. Above a first performance point corresponding to a rotational speed n1, however, the torque decreases linearly with increasing motor rotational speed. Above a second performance point corresponding to a motor rotational speed n2, the torque finally becomes zero. This means that above a certain rotational speed, the system no longer has any acceleration capacity in order to be able to follow a wheel movement of the vehicle. Thus the system hardens and the two wheels of the vehicle are no longer decoupled from one another.

Figure 7:
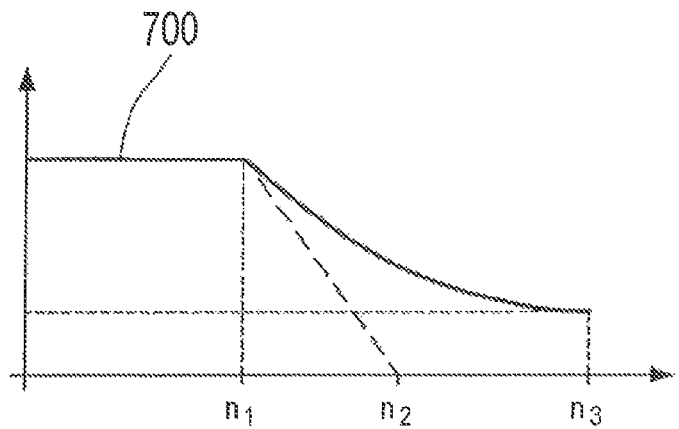
FIG. 7: A diagram to represent a performance graph of an electric motor with FOR control, according to an example embodiment of the present invention.

FIG. 7 shows a diagram representing a performance graph 700 of an electric motor with FOR control (FOR=field-orientated control), according to an example embodiment of the present invention. The electric motor is for example the electric motor 135 shown in FIGS. 1 and 2. If the electric motor is under field-orientated control, then it is evident from the corresponding performance graph 700 that compared with the brushless DC control method whose result is illustrated in FIG. 6, the electric motor still produces a motor torque even at a higher rotational speed n3. This enables one-sided wheel reciprocating movements of the vehicle to be compensated.

Otherwise than in FIG. 6, with increasing rotational speed the performance graph 700 decreases from the first performance point in a non-linear or only approximately linear manner or along a curve, so that above a third performance point corresponding to the rotational speed n3 the electric motor still produces a high enough torque.

Conventional anti-roll stabilizing systems often comprise a brushless DC control motor. Compared with brushless DC control, the control of an ERC system (electro-mechanical roll control) by means of a field-orientated control system offers the possibility of compensating even higher wheel excitation levels such as those occurring at higher vehicle driving speeds, and thereby increasing driving comfort.

Figure 8:
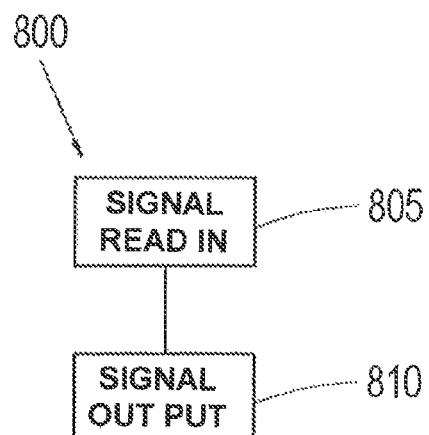
FIG. 8: A block sequence diagram of a method for operating a stabilizer according to an example embodiment of the present invention.

FIG. 8 shows a sequence diagram of a method 800 for operating a stabilizer according to an example embodiment of the present invention. The method 800 comprises a step 805 in which a reciprocating movement signal is read in, the reciprocating movement signal representing reciprocating movement of the first wheel suspension element and/or of the second wheel suspension element. In addition the method 800 comprises a step 810 in which the control signal is provided on the basis of a field-orientated control system and using the reciprocating movement signal, in order to rotate the first stabilizer element relative to the second stabilizer element by means of the electric motor so as to decouple the first wheel suspension element from the second wheel suspension element.

Figure 9:
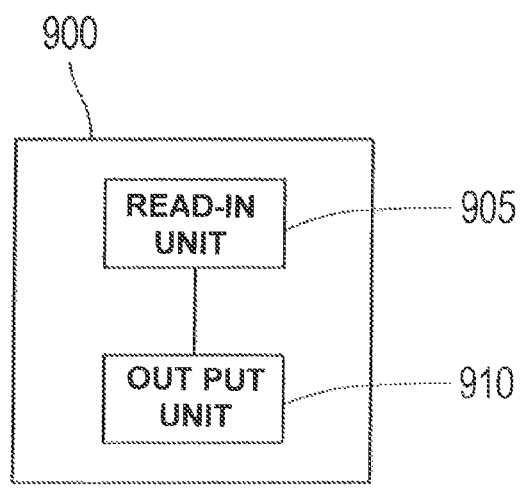
FIG. 9: A block diagram of a control unit for carrying out a method for operating a stabilizer according to an example embodiment of the present invention.

FIG. 9 shows a block diagram of a control unit 900 for implementing a method for operating a stabilizer according to an example embodiment of the present invention. The control unit 900 is for example the device 140 shown in FIG. 1. The control unit 900 comprises a read-in unit 905 designed to read in a reciprocating movement signal, the reciprocating movement signal representing a reciprocating movement of the first wheel suspension element and/or of the second wheel suspension element. Connected to the read-in unit 905 there is a providing unit 910 designed to generate and provide the control signal on the basis of a field-orientated control system and using the reciprocating movement signal, in order to rotate the first stabilizer element relative to the second stabilizer element by means of the electric motor so as to decouple the first wheel suspension element from the second wheel suspension element.

The example embodiments described and illustrated in the figures have only been chosen as examples. Different example embodiments can be combined with one another completely or in relation to particular features. Furthermore, one example embodiment can be supplemented by features of another example embodiment.

Moreover, method steps according to the invention can be repeated or carried out in a sequence different from that described.

If an example embodiment comprises an "and/or" link between a first feature and a second feature, then this can be interpreted in such manner that in one version the example embodiment comprises both the first and the second of the two said features, and in another version either only the first feature or only the second feature.

INDEXES

100 Vehicle
105 Stabilizer
110 First stabilizer element
115 Second stabilizer element
120 First wheel suspension element
125 Second wheel suspension element
130 Body-mounted bearing
135 Electric motor
140 Device for providing a control signal
200 Conventional stabilizer
300 Stabilizer for hydraulic roll stabilization
400 Stator
405 Rotor
410 Stator vane
415 Rotor vane
420 Working chamber
500 Gearset
600 Performance graph of an electric motor with brushless DC control
700 Performance graph of an electric motor with FOR control
800 Method for operating a stabilizer
805 Reading in a reciprocating movement signal
810 providing a control signal
900 Control unit
905 Read-in unit
910 Providing unit

The invention claimed is:

1. A stabilizer (105) for anti-roll stabilization of a vehicle (100), wherein the stabilizer (105) comprises:
a first stabilizer element (110), and a second stabilizer element (115),
the first stabilizer element (110) is connectable to a first wheel suspension element (120) of the vehicle (100) and the second stabilizer element (115) is connectable to a second wheel suspension element (125) of the vehicle (100);
a control unit having read-in unit and a providing unit, the read-in unit reading in a reciprocating movement signal representing reciprocating movement of at least one of the first and the second wheel suspension elements, and the read-in unit transmitting the reciprocating movement signal to the providing unit;
the providing unit determining a control signal using an algorithm of a field-orientated control system and based on the reciprocating movement signal; and
at least one electric motor (135), which rotates the first stabilizer element (110) relative to the second stabilizer element (115) in response to the control signal, in order to decouple the first wheel suspension element (120) from the second wheel suspension element (125).

2. A vehicle (100) in combination with at least one stabilizer (105) for anti-roll stabilization of the vehicle (100), the stabilizer (105) comprises:
a first stabilizer element (110) and a second stabilizer element (115),
the first stabilizer element (110) is connectable to a first wheel suspension element (120) of the vehicle (100) and the second stabilizer element (115) is connectable to a second wheel suspension element (125) of the vehicle (100);

a control unit having a read-in unit and a providing unit, the read-in unit reading in a reciprocating movement signal representing reciprocating movement of at least one of the first and the second wheel suspension elements, and the read-in unit transmitting the reciprocating movement signal to the providing unit;

the providing unit determining a control signal, based on the reciprocating movement signal, using an algorithm of a field-orientated control system; and at least one electric motor (135), which rotates the first stabilizer element (110) relative to the second stabilizer element (115) in response to the control signal, in order to decouple the first wheel suspension element (120) from the second wheel suspension element (125).

3. A method (800) for operating a stabilizer (105) for anti-roll stabilization of a vehicle (100), the stabilizer (105) having a first stabilizer element (110) and a second stabilizer element (115), the first stabilizer element (110) being connectable to a first wheel suspension element (120) of the vehicle (100) and the second stabilizer element (115) being connectable to a second wheel suspension element (125) of the vehicle (100), and at least one electric motor (135), which is designed to rotate the first stabilizer element (110) relative to the second stabilizer element (115) in response to a control signal, in order to decouple the first wheel suspension element (120) from the second wheel suspension element (125), the control signal being a signal determined by using an algorithm of a field-orientated control system, the method (800) comprising steps of:

reading-in (805) of a reciprocating movement signal, and the reciprocating movement signal representing reciprocating movement of at least one of the first wheel suspension element (120) and the second wheel suspension element (125); and providing (810) the control signal using an algorithm of a field-orientated control system and also using the reciprocating movement signal to produce rotation of the first stabilizer element (110) relative to the second stabilizer element (115) by the at least one electric motor so as to decouple the first wheel suspension element (120) from the second wheel suspension element (125).

4. The method (800) according to claim 3, further comprising carrying out a d/q transformation in the providing step (810) to determine the control signal.

5. The method (800) according to claim 4, further comprising reading in a rotor angle signal in the read-in step (805), with the rotor angle signal representing an angle of a rotor of the at least one electric motor (135), and, in the providing step (810), carrying out the d/q transformation using the rotor angle signal.

6. The method (800) according to claim 3, further comprising determining the control signal in the providing step (810) using at least one of a torque, an electric flux density of the at least one electric motor (135), and a relationship between the torque and the electric flux density.

7. The method (800) according to claim 3, further comprising additionally determining the control signal, in the providing step (810), on a basis of an observer system.

8. A control unit (900) for at least one of carrying out and controlling all the steps of the method (800) according to claim 3.

9. A computer program for implementing all the steps of the method (800) according to claim 3.

10. A machine-readable storage medium with the computer program according to claim 9 stored on the machine-readable storage medium.

11. The stabilizer according to claim 1, wherein the reciprocating movement signal being a signal which represents vertical reciprocating movement of a wheel.

12. The vehicle in combination with the at least one stabilizer according to claim 2, wherein the reciprocating movement signal being a signal which represents vertical reciprocating movement of a wheel.

* * * * *